(12) United States Patent
Chen et al.

(10) Patent No.: US 11,632,156 B2
(45) Date of Patent: *Apr. 18, 2023

(54) CHANNEL STATE INFORMATION REPORTING TECHNIQUES IN SIDELINK WIRELESS COMMUNICATIONS

(71) Applicant: QUALCOMM Incorporated, San Diego, CA (US)

(72) Inventors: Wanshi Chen, San Diego, CA (US); Sudhir Kumar Baghel, Fremont, CA (US); Juan Montojo, San Diego, CA (US); Peter Gaal, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/521,587

(22) Filed: Nov. 8, 2021

(65) Prior Publication Data

US 2022/0069871 A1 Mar. 3, 2022

Related U.S. Application Data

(63) Continuation of application No. 16/803,117, filed on Feb. 27, 2020, now Pat. No. 11,190,248.

(51) Int. Cl.
*H04B 7/0456* (2017.01)
*H04B 7/06* (2006.01)
(Continued)

(52) U.S. Cl.
CPC ......... *H04B 7/0486* (2013.01); *H04B 7/0632* (2013.01); *H04B 7/0639* (2013.01);
(Continued)

(58) Field of Classification Search
CPC .. H04B 7/0486; H04B 7/0632; H04B 7/0639; H04B 7/0658; H04B 7/0417; H04W 4/40;
(Continued)

(56) References Cited

U.S. PATENT DOCUMENTS 9,614,655 B2 * 4/2017 Kim ...................... H04L 5/0032
11,190,248 B2 * 11/2021 Chen .................... H04W 88/04
(Continued)

FOREIGN PATENT DOCUMENTS

| WO | WO2018231997 A1 | 12/2018 |
|---|---|---|
| WO | WO2019041109 A1 | 3/2019 |

OTHER PUBLICATIONS

International Search Report and Written Opinion—PCT/US2020/023002—ISA/EPO—dated Jun. 15, 2020.

*Primary Examiner* — Harry H Kim
(74) *Attorney, Agent, or Firm* — Holland & Hart LLP/Qualcomm Incorporated

(57) ABSTRACT

Methods, systems, and devices for wireless communications are described in which a receiving device, such as a receiving user equipment (UE) or vehicle, may provide channel state information (CSI) in which two or more parameters associated with the CSI are provided in a single joint indication. A transmitting device may transmit one or more reference signals and the receiving device may perform one or more measurements on the received reference signal(s). Based on the one or more measurements, the receiving device may determine one or more CSI parameters, such as a rank indicator, channel quality indicator, precoding matrix indicator, or combinations thereof, that may be provided to the transmitting device in a joint indication.

20 Claims, 14 Drawing Sheets

Related U.S. Application Data

(60) Provisional application No. 62/820,250, filed on Mar. 18, 2019.

(51) Int. Cl.
| | | |
|---|---|---|
| *H04W 4/40* | (2018.01) | |
| *H04W 24/10* | (2009.01) | |
| *H04W 76/27* | (2018.01) | |
| *H04W 92/18* | (2009.01) | |
| *H04W 4/46* | (2018.01) | |
| *H04L 5/00* | (2006.01) | |
| *H04W 76/14* | (2018.01) | |
| *H04W 88/04* | (2009.01) | |
| *H04L 1/18* | (2006.01) | |
| *H04W 4/44* | (2018.01) | |
| *H04W 4/70* | (2018.01) | |
| *H04L 1/00* | (2006.01) | |
| *H04B 7/0417* | (2017.01) | |

(52) U.S. Cl.
CPC ............ *H04W 4/40* (2018.02); *H04W 24/10* (2013.01); *H04W 76/27* (2018.02); *H04W 92/18* (2013.01)

(58) Field of Classification Search
CPC ..... H04W 24/10; H04W 76/27; H04W 92/18; H04W 4/46; H04W 76/14; H04W 88/04; H04W 4/44; H04W 4/70; H04L 5/0091; H04L 5/0053; H04L 1/1812; H04L 5/0048; H04L 1/00
See application file for complete search history.

(56) References Cited

U.S. PATENT DOCUMENTS

| | | | |
|---|---|---|---|
| 2010/0273435 A1 | 10/2010 | Sun et al. | |
| 2016/0323022 A1* | 11/2016 | Rahman | H04B 7/0639 |
| 2017/0111886 A1* | 4/2017 | Kim | H04W 72/042 |
| 2018/0115355 A1 | 4/2018 | Nagata et al. | |
| 2019/0007248 A1 | 1/2019 | Takeda et al. | |
| 2019/0081737 A1 | 3/2019 | Huang et al. | |
| 2019/0327618 A1 | 10/2019 | Li et al. | |
| 2020/0153495 A1 | 5/2020 | Li et al. | |
| 2020/0304183 A1 | 9/2020 | Chen et al. | |
| 2021/0351881 A1* | 11/2021 | Park | H04B 7/06 |
| 2022/0110155 A1* | 4/2022 | Chou | H04W 74/085 |
| 2022/0132349 A1* | 4/2022 | Li | H04B 7/0417 |

\* cited by examiner

| Joint Indication Index Value 310 | CQI 315 | RI 320 |
|---|---|---|
| Index Value 1 | 1 | 1 |
| Index Value 2 | 2 | 1 |
| ⋮ | ⋮ | ⋮ |
| Index Value N | N | 1 |
| Index Value N + 1 | N+1 | 2 |
| ⋮ | ⋮ | ⋮ |
| Index Value N + M | N + M | 2 |
| ⋮ | ⋮ | ⋮ |
|  |  |  |

FIG. 3

CHANNEL STATE INFORMATION REPORTING TECHNIQUES IN SIDELINK WIRELESS COMMUNICATIONS

CROSS REFERENCE

The present application for patent is a Continuation of U.S. patent application Ser. No. 16/803,117 by CHEN et al., entitled "CHANNEL STATE INFORMATION REPORTING TECHNIQUES IN SIDELINK WIRELESS COMMUNICATIONS' filed Feb. 27, 2020, which claims the benefit of U.S. Provisional Patent Application No. 62/820,250 by CHEN et al., entitled "CHANNEL STATE INFORMATION REPORTING TECHNIQUES IN SIDELINK WIRELESS COMMUNICATIONS," filed Mar. 18, 2019, assigned to the assignee hereof, and expressly incorporated herein by reference in its entirety.

BACKGROUND

The following relates generally to wireless communications, and more specifically to channel state information reporting techniques in sidelink wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, such as distributed wireless networks, wireless devices (e.g., UEs) may directly communicate with each other (e.g., via sidelink communications) and may support various radio frequency or baseband capabilities. In some cases, direct communications between wireless devices may include direct communications between vehicles and systems that use such communications which may sometimes be referred to as vehicle-to-vehicle (V2V) or vehicle-to-everything (V2X) communication systems. V2X communication links may convey information between vehicles regarding inclement weather, nearby accidents, road conditions, or the activities of nearby vehicles, for example. V2X communication systems may also be used by autonomous or semi-autonomous vehicles (e.g., self-driving vehicles or vehicles that provide driver assistance) and may provide extra information beyond the reach of the vehicle's existing system. Such V2X communications links may provide certain safety-related information (e.g., location, direction of travel, velocity) in unencrypted messages so that other vehicles may receive such information. In order to maintain sidelink communication links, a receiving device (e.g., a vehicle that receives unicast transmissions from a transmitting vehicle) may provide channel state information (CSI) to a transmitting device. Providing CSI to a transmitting device may add overhead and consume a portion of available wireless resources, and thus efficient communication of such information may enhance system performance and reliability.

SUMMARY

The described techniques relate to improved methods, systems, devices, and apparatuses that support channel state information reporting techniques in sidelink wireless communications. In some aspects of the disclosure, a receiving device, such as a receiving user equipment (UE) or vehicle, may provide channel state information (CSI) in which two or more parameters associated with the CSI are provided in a single joint indication. In some cases, a transmitting device (e.g., a transmitting UE or transmitting vehicle) may transmit one or more reference signals (e.g., a channel state information reference signal (CSI-RS)), and the receiving device may perform one or more measurements on the received reference signal(s). Based on the one or more measurements, the receiving device may determine one or more CSI parameters, such as a rank indicator (RI), channel quality indicator (CQI), precoding matrix indicator (PMI), or combinations thereof.

In some cases, different combinations of CSI parameters are mapped to different joint indication values, and the receiving device may provide one of the joint indication values to the transmitting device to indicate the two or more CSI parameters (e.g., RI and CQI). In some cases, a set of tables may be provided that include different combinations of CSI parameters that are mapped to different joint indication values, and the transmitting device and receiving device may be configured (e.g., via radio resource control signaling) to use a particular table of the set of tables for CSI reports for sidelink communications.

A method of wireless communication at a receiving device is described. The method may include receiving, via sidelink communications from a transmitting device, one or more reference signals for determination of at least a rank indicator and a channel quality indicator at the receiving device, identifying, based on one or more measurements of the one or more reference signals, a joint indication that provides at least the rank indicator and the channel quality indicator of the receiving device, and transmitting, via the sidelink communications, the joint indication to the transmitting device.

An apparatus for wireless communication at a receiving device is described. The apparatus may include a processor, memory in electronic communication with the processor, and instructions stored in the memory. The instructions may be executable by the processor to cause the apparatus to receive, via sidelink communications from a transmitting device, one or more reference signals for determination of at least a rank indicator and a channel quality indicator at the receiving device, identify, based on one or more measurements of the one or more reference signals, a joint indication that provides at least the rank indicator and the channel quality indicator of the receiving device, and transmit, via the sidelink communications, the joint indication to the transmitting device.

Another apparatus for wireless communication at a receiving device is described. The apparatus may include means for receiving, via sidelink communications from a transmitting device, one or more reference signals for determination of at least a rank indicator and a channel quality indicator at the receiving device, identifying, based on one or more measurements of the one or more reference signals, a joint indication that provides at least the rank indicator and the channel quality indicator of the receiving device, and transmitting, via the sidelink communications, the joint indication to the transmitting device.

A non-transitory computer-readable medium storing code for wireless communication at a receiving device is described. The code may include instructions executable by a processor to receive, via sidelink communications from a transmitting device, one or more reference signals for determination of at least a rank indicator and a channel quality indicator at the receiving device, identify, based on one or more measurements of the one or more reference signals, a joint indication that provides at least the rank indicator and the channel quality indicator of the receiving device, and transmit, via the sidelink communications, the joint indication to the transmitting device.

A method of wireless communication at a transmitting device is described. The method may include transmitting, via sidelink communications to a receiving device, one or more reference signals for determination of at least a rank indicator and a channel quality indicator at the receiving device, receiving, via the sidelink communications from the receiving device, a joint indication that provides at least the rank indicator and the channel quality indicator of the receiving device, and communicating with the receiving device via the sidelink communications based on the rank indicator and the channel quality indicator.

An apparatus for wireless communication at a transmitting device is described. The apparatus may include a processor, memory in electronic communication with the processor, and instructions stored in the memory. The instructions may be executable by the processor to cause the apparatus to transmit, via sidelink communications to a receiving device, one or more reference signals for determination of at least a rank indicator and a channel quality indicator at the receiving device, receive, via the sidelink communications from the receiving device, a joint indication that provides at least the rank indicator and the channel quality indicator of the receiving device, and communicate with the receiving device via the sidelink communications based on the rank indicator and the channel quality indicator.

Another apparatus for wireless communication at a transmitting device is described. The apparatus may include means for transmitting, via sidelink communications to a receiving device, one or more reference signals for determination of at least a rank indicator and a channel quality indicator at the receiving device, receiving, via the sidelink communications from the receiving device, a joint indication that provides at least the rank indicator and the channel quality indicator of the receiving device, and communicating with the receiving device via the sidelink communications based on the rank indicator and the channel quality indicator.

A non-transitory computer-readable medium storing code for wireless communication at a transmitting device is described. The code may include instructions executable by a processor to transmit, via sidelink communications to a receiving device, one or more reference signals for determination of at least a rank indicator and a channel quality indicator at the receiving device, receive, via the sidelink communications from the receiving device, a joint indication that provides at least the rank indicator and the channel quality indicator of the receiving device, and communicate with the receiving device via the sidelink communications based on the rank indicator and the channel quality indicator.

BRIEF DESCRIPTION OF THE DRAWINGS

FIG. 3 illustrates an example of CSI mapping tables that support channel state information reporting techniques in sidelink wireless communications in accordance with aspects of the present disclosure.

DETAILED DESCRIPTION

Figure 1:
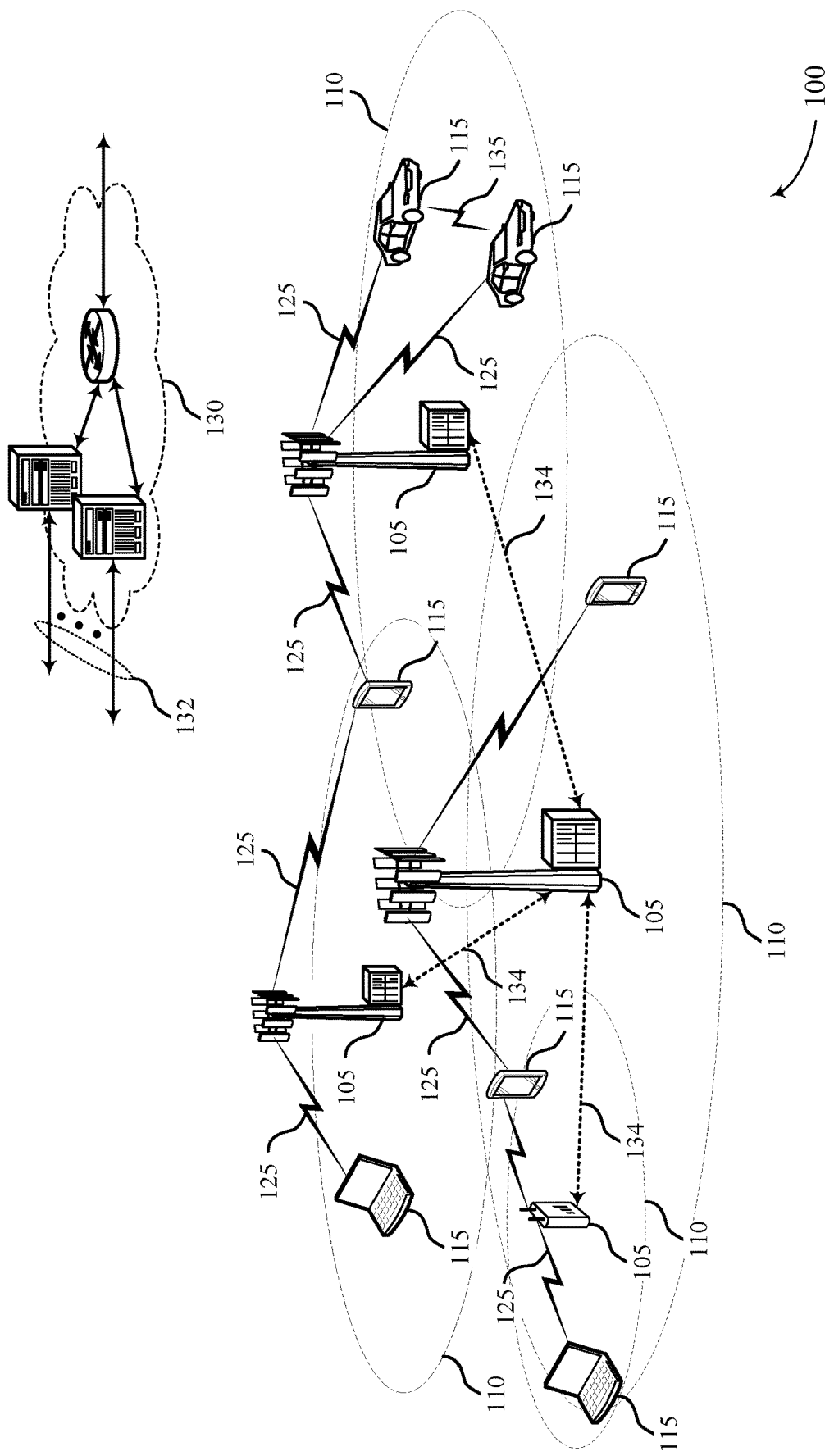
FIG. 1 illustrates an example of a system for wireless communications that supports channel state information reporting techniques in sidelink wireless communications in accordance with aspects of the present disclosure.

Some wireless communication systems may be used to facilitate communications with various devices, which may include direct device-to-device (D2D) communications using sidelink communication links. For example, direct communications between vehicles may use sidelink communications, and these systems may sometimes be referred to as vehicle-to-everything (V2X) or vehicle-to-vehicle (V2V) communication systems. In some cases, in order to maintain sidelink communications links, a receiving device (e.g., a receiving sidelink user equipment (UE)/vehicle), may provide a channel state information (CSI) measurement report, which may be used by a transmitting device (e.g., a transmitting sidelink UE/vehicle) to adjust one or more transmission parameters to accommodate for particular channel conditions of a sidelink communications link.

For example, a CSI measurement report may include a number of indicators that provide transmission parameters that are suitable for communications, such as a channel quality indicator (CQI) that may indicate a suitable data rate (e.g., a modulation and coding scheme (MCS) value), a rank indicator (RI) that corresponds to a number of useful transmission layers for spatial multiplexing (e.g., based on the receiving device's estimate of the downlink channel), a precoding matrix indicator (PMI) that corresponds to an index of a precoder (e.g., within a codebook shared by the transmitting/receiving device) that maximizes an aggregate number of data bits that can be received across all spatial transmission layers.

In traditional systems, such CSI measurement report parameters are provided in separate fields within a CSI measurement report. According to various aspects of the present disclosure, one or more indications associated with a CSI measurement report may be jointly reported in a single joint indication. Such techniques may enhance efficiency of a system by reducing overhead associated with CSI measurement reports that are transmitted between sidelink communications devices. In some cases, the joint indication may provide reduced granularity for one or more parameters (e.g., CQI) relative to CSI measurement reports that have separate fields, which may help to further reduce associated overhead. In some cases, such as in V2X systems, such reduced granularity is sufficient for communications because the devices are moving in relation to each other which may render increased granularity of measurements invalid after relatively short periods of time.

In some aspects of the present disclosure, joint coding of RI and CQI may use expanded bit width (e.g., 5 bits) relative to a CQI bit width provided in some existing systems, or may use an existing bit width (e.g., 4 bits, but with reduced CQI entries per rank). In some cases, different combinations of CQI and RI values are associated with different joint indication index values in a table that is configured at sidelink devices. In some cases, multiple different tables may be defined, and one of the tables may be selected (e.g., using radio resource control (RRC) signaling) for sidelink communications (e.g., by a transmitting device or a serving base station). Additionally, PMI may be included in one or more of the tables, and may be jointly reported by a receiving device based on the index value associated with a particular determined CQI, RI, and PMI. In some cases, one or more of the transmitting device or the receiving device may provide the joint indication to a serving base station (e.g., a gNB) for sidelink scheduling purposes. Such techniques may provide for relatively efficient signaling between sidelink devices, and may thus enhance reliability and efficiency of a sidelink communications system.

Aspects of the disclosure are initially described in the context of a wireless communications system. Aspects of the disclosure are further illustrated by and described with reference to apparatus diagrams, system diagrams, and flowcharts that relate to channel state information reporting techniques in sidelink wireless communications.

FIG. 1 illustrates an example of a wireless communications system 100 that supports channel state information reporting techniques in sidelink wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support sidelink or V2X communications between UEs 115, such as through proximity-based services (ProSe) which provide techniques for ProSe direct discovery of UEs 115 and for ProSe direct communication between UEs 115. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

Wireless communications system 100 may support direct communication between UEs 115 over a sidelink 135 (e.g., using a peer-to-peer (P2P), device-to-device (D2D) protocol, or ProSe direct communications). Sidelink communication may be used for D2D media-sharing, vehicle-to-vehicle (V2V) communication, V2X communication (or cellular V2X (cV2X) communication), emergency rescue applications, etc. One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or another interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. In cases where D2D or V2X communications are used, a V2X layer may provide related protocols, and in some cases, may use ProSe direct communications protocols (e.g., PC5 signaling). A Radio Link Control (RLC) layer may, in some cases, perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

In some cases, a device (e.g., a UE 115) may provide channel state information (CSI) in which two or more parameters associated with the CSI are provided in a single joint indication. In some cases, a transmitting device (e.g., a transmitting UE 115 or transmitting vehicle) may transmit one or more reference signals (e.g., a CSI-RS), and the receiving device may perform one or more measurements on the received reference signal(s). Based on the one or more measurements, the receiving device may determine one or more CSI parameters, such as an RI, channel CQI, PMI, or combinations thereof, and provide an indication of each of the parameters in a single joint indication to the transmitting device.

Figure 2:
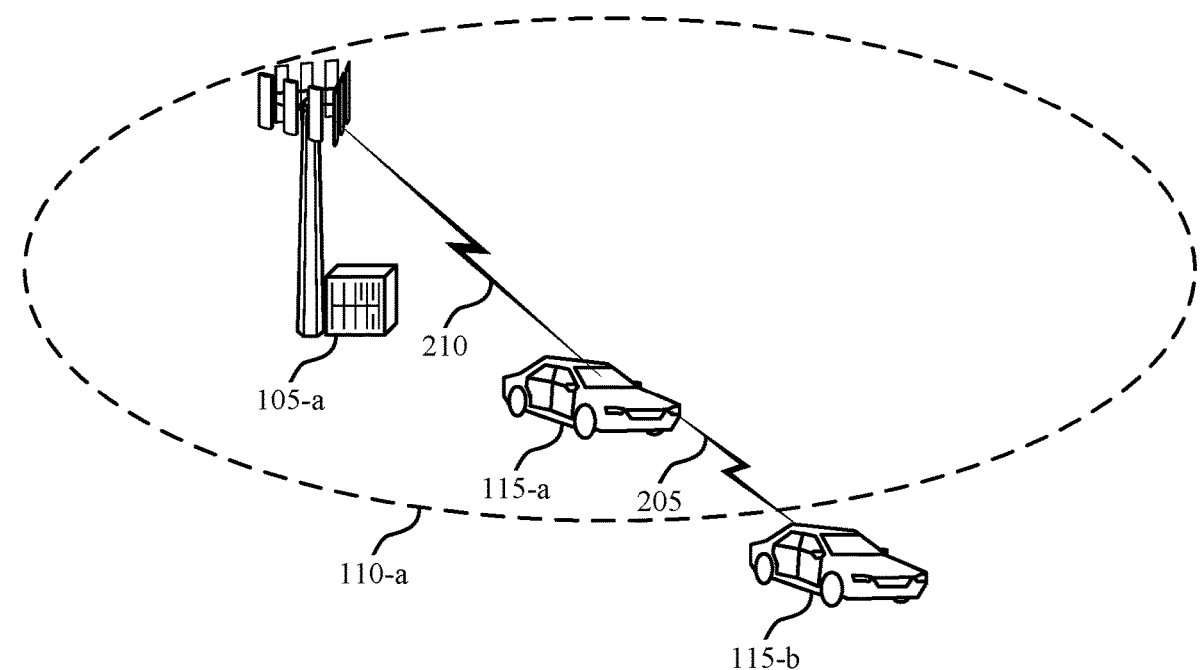
FIG. 2 illustrates an example of a wireless communications system that supports channel state information reporting techniques in sidelink wireless communications in accordance with aspects of the present disclosure.

FIG. 2 illustrates an example of a wireless communications system 200 that supports channel state information reporting techniques in sidelink wireless communications in accordance with aspects of the present disclosure. In some examples, wireless communications system 200 may implement aspects of wireless communications system 100. Wireless communications system 200 may include a base station 105-a, a transmitting UE 115-a, and a receiving UE 115-b, which may be examples of corresponding devices in wireless communications system 100.

In some cases, UEs 115 may be vehicles. In some cases, UEs 115 may be integrated with a vehicle. UEs 115-a or 115-b may be examples of a UE 115 described with reference to FIG. 1 (e.g., a phone, laptop, vehicle), and may be configured for sidelink or V2X communication over one or more carriers (e.g., ProSe direct communications). In some examples, UEs 115 may execute one or more sets of codes or sequences, to control the functional elements of the device, and may perform some or all of the functions described herein. In some cases, a communications manager at each UE 115 may manage V2X communications and CSI parameters used in a communication link in the V2X communications. While various examples described herein illustrate V2X communications using LTE or NR between UEs 115, it will be understood that techniques provided herein may be used in other communications systems that may use different radio access technologies and communications protocols.

In some examples, a base station 105-a may communicate with transmitting UE 115-a (and one or more other UEs) via bidirectional communication link 210 in a geographic coverage area 110-a. Base station 105-a may, for example, grant resources for sidelink communication to one or more UEs 115 (e.g., UE 115-a and UE 115-b). The transmitting sidelink UE 115-a may perform sidelink communications on granted sidelink resources with receiving sidelink UE 115-b via bidirectional communication link 205. In some examples, sidelink UE 115-a and sidelink UE 115-b may be examples of V2X UEs 115.

In some cases, the transmitting UE 115-a may transmit a reference signal (e.g., a CSI-RS) that may be received at the receiving UE 115-b. The receiving UE 115-b may perform one or more measurements on the reference signal and may provide a CSI report in which two or more parameters associated with the CSI report are provided in a single joint indication. In some cases, based on the one or more measurements, the receiving UE 115-b may determine an RI and CQI. Further, in some cases, the receiving UE may determine a PMI.

In some cases, different combinations of CSI parameters are mapped to different joint indication values, and the receiving UE 115-b may provide one of the joint indication values to the transmitting UE 115-a to indicate the two or more CSI parameters (e.g., RI and CQI). In some cases, a set of tables, such as discussed in the example of FIG. 3, may be provided that include different combinations of CSI parameters that are mapped to different joint indication values, and the transmitting UE 115-a and receiving UE 115-b may be configured (e.g., via radio resource control signaling) to use a particular table of the set of tables for CSI reports for sidelink communications. In some cases, the joint CQI/RI (and possibly PMI) indication may be transmitted by the receiving UE 115-b in a report that is transmitted on a physical sidelink shared channel (PSSCH), a physical sidelink control channel (PSCCH), or a physical sidelink feedback channel (PSFCH).

FIG. 3 illustrates an example of a CSI mapping tables 300 that supports channel state information reporting techniques in sidelink wireless communications in accordance with aspects of the present disclosure. In some examples, CSI mapping tables 300 may implement aspects of wireless communications system 100 or 200. In this example, a transmitting device (e.g., transmitting UE 115-a of FIG. 2) and a receiving device (e.g., a receiving UE 115-b of FIG. 2) may be configured with a number of CSI mapping tables 305, including first CSI mapping table 305-a, second CSI mapping table 305-b, through nth CSI mapping table 305-n.

The CSI mapping tables 305 may include, in this example, a joint indication index value 310, that is associated with different CQI 315 and RI 320 values. For example, index value 1 may be mapped to CQI 1 and RI 1 (e.g., according to established indicator values that are mapped to CQI and RI, such as according to established NR standards). In cases where the receiving device determines CQI 1 and RI 1, based on CSI-RS measurements, the receiving device may report the index value 1 as the joint indication value to the transmitting device, which may in turn determine the associated CQI and RI. In some cases, a number of CSI mapping tables 305 may be provided based on a desired granularity for CSI reporting parameters (e.g., in systems with relatively low movement between devices, increased granularity may be suitable, and in systems with relatively high movement between devices, reduced granularity may be suitable). In some cases, one or more of the CSI mapping tables 305 may also include a column for PMI, and different combinations of RI, CQI, and PMI may be mapped to associated index values that may be used to report a joint indication of RI, CQI and PMI. In some cases, the transmitting UE may select a table of the CSI mapping tables to be used for sidelink communications with the receiving UE, and may configure the receiving UE with the selected table using RRC signaling. Additionally or alternatively, a serving base station may select a table of the CSI mapping tables to be used for sidelink communications of multiple served UEs, and may provide one or more of the sidelink UEs with an indication of the selected CSI mapping table. In cases where the receiving UE is outside of a coverage area of the serving base station, the transmitting UE may provide the receiving UE with an indication of the table that is selected by the serving base station.

In some cases, one or both of the transmitting UE or receiving UE may provide the joint indication to the serving base station, which the base station may use for sidelink scheduling purposes. In some cases, the joint indication may be provided to the serving base station using a format that is established for a radio interface between the base station and UE (e.g., using a same format as in a Uu link).

Figure 4:
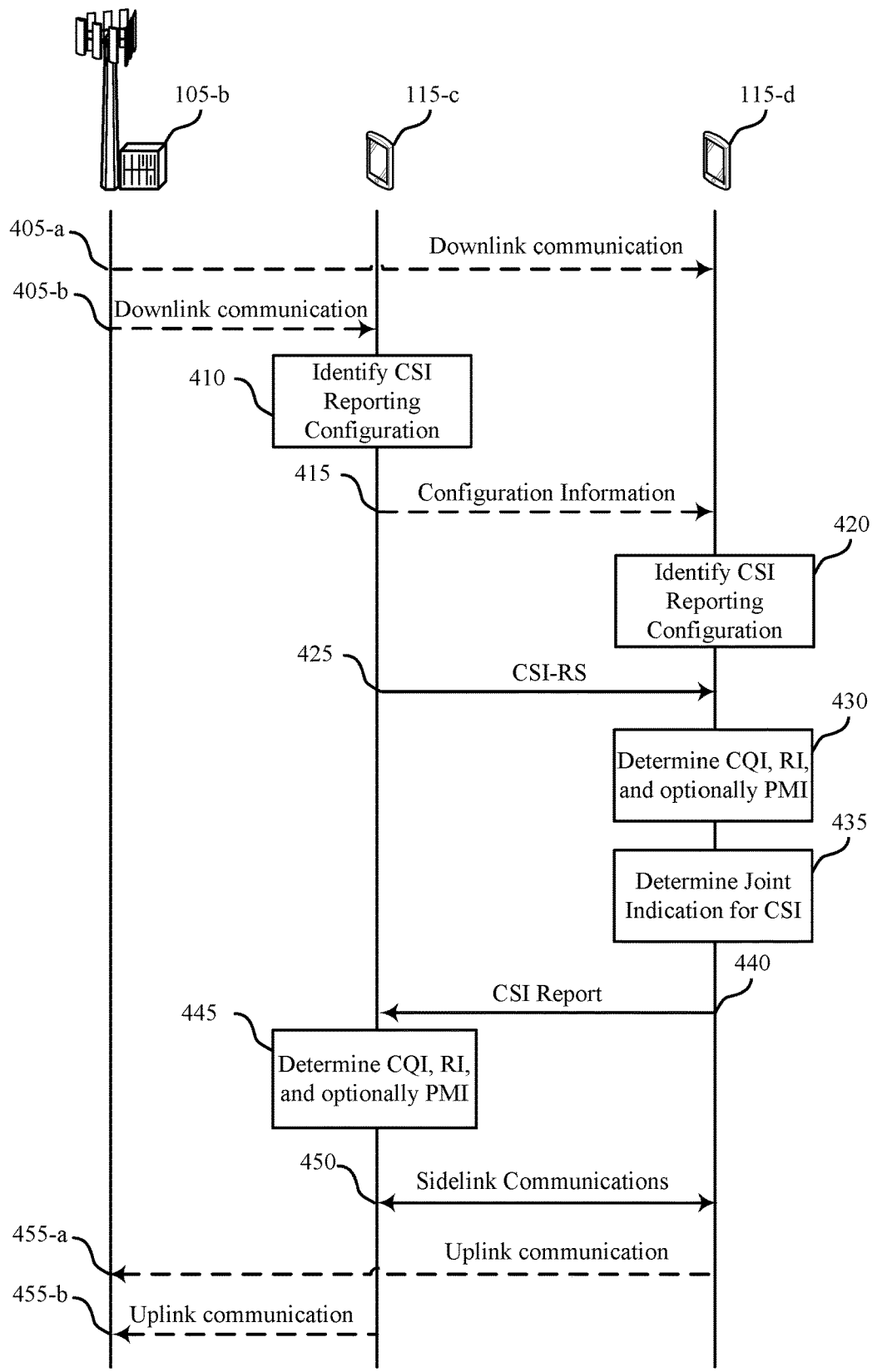
FIG. 4 illustrates an example of a process flow that supports channel state information reporting techniques in sidelink wireless communications in accordance with aspects of the present disclosure.

FIG. 4 illustrates an example of a process flow 400 that supports channel state information reporting techniques in sidelink wireless communications in accordance with aspects of the present disclosure. In some examples, process flow 400 may implement aspects of wireless communications system 100 or 200. Process flow 400 may be implemented by a base station 105-b, a UE 115-c, and a UE 115-d, which may be examples of corresponding devices in wireless communications system 100 and wireless communications system 200.

In some examples, base station 105-b may communicate with one or more UEs 115 (e.g., UE 115-c and UE 115-d). In some examples, UE 115-c and UE 115-d may be sidelink UEs 115. In some cases, UE 115-c and UE 115-d may be vehicles. In some cases, UE 115-c and UE 115-d may be integrated with a vehicle. UEs 115-c or 115-d may be examples of a UE 115 described with reference to FIG. 1 (e.g., a phone, laptop, vehicle), and may be configured for V2X communication over one or more carriers (e.g., using ProSe direct communications). In some cases, a communications manager at each UE 115 may manage V2X communications.

At 405-a and 405-b, base station 105-b may optionally send a downlink communication to one or both of UE 115-c and UE 115-d. Such downlink communications may indicate resources for sidelink communication, parameters for sidelink communication, and the like.

At 410, UE 115-c may identify a CSI reporting configuration for sidelink communications. Such a CSI reporting configuration may include, for example, an identification of a CSI mapping table that is to be used to provide a joint indication of one or more CSI indications (e.g., a joint RI and CQI indication). At 415, the identified CSI reporting configuration may optionally be provided to the UE 115-d (e.g., via RRC signaling).

At 420, UE 115-d may identify the CSI reporting configuration for sidelink communications. In some cases, the UE 115-d may receive the CSI reporting configuration from the base station 105-b. In other cases, the UE 115-d may receive the CSI reporting configuration from UE 115-c (e.g., when UE 115-c selected the CSI reporting configuration or when UE 115-d is outside of a coverage area of base station 105-b.

At 425, the UE 115-c may transmit a CSI-RS, which may be received at UE 115-d. At 430, UE 115-d may perform one or more measurements on the CSI-RS, and determine CQI, RI, and optionally PMI.

At 435, the UE 115-d may determine the joint indication for a CSI report. The joint indication may be, for example, a joint CSI/RI indication that is determined by a CSI mapping table that is configured at the UEs 115. In some other cases, the joint indication may be a joint CSI/RI/PMI indication that is determined by a CSI mapping table that is configured at the UEs 115. At 440, the UE 115-d may transmit a CSI report to the UE 115-c that includes the joint indication.

At 445, the UE 115-c may determine the reported CQI, RI, and optionally PMI, based on the joint indication provided in the CSI report. As discussed herein, the determination of the reported CQI, RI, and PMI may be based on the CSI mapping table that is configured at the UEs 115.

At 450, the UEs 115 may perform sidelink communications according to one or more transmission parameters that are determined based on the CSI report. In some cases, at 455-a and 455-b, one or both of the UEs 115 may transmit uplink communications to the base station 105-b. Such uplink communications may include the joint indication provided by UE 115-d, which may be used by the base station 105-b for sidelink scheduling, for example.

Figure 5:
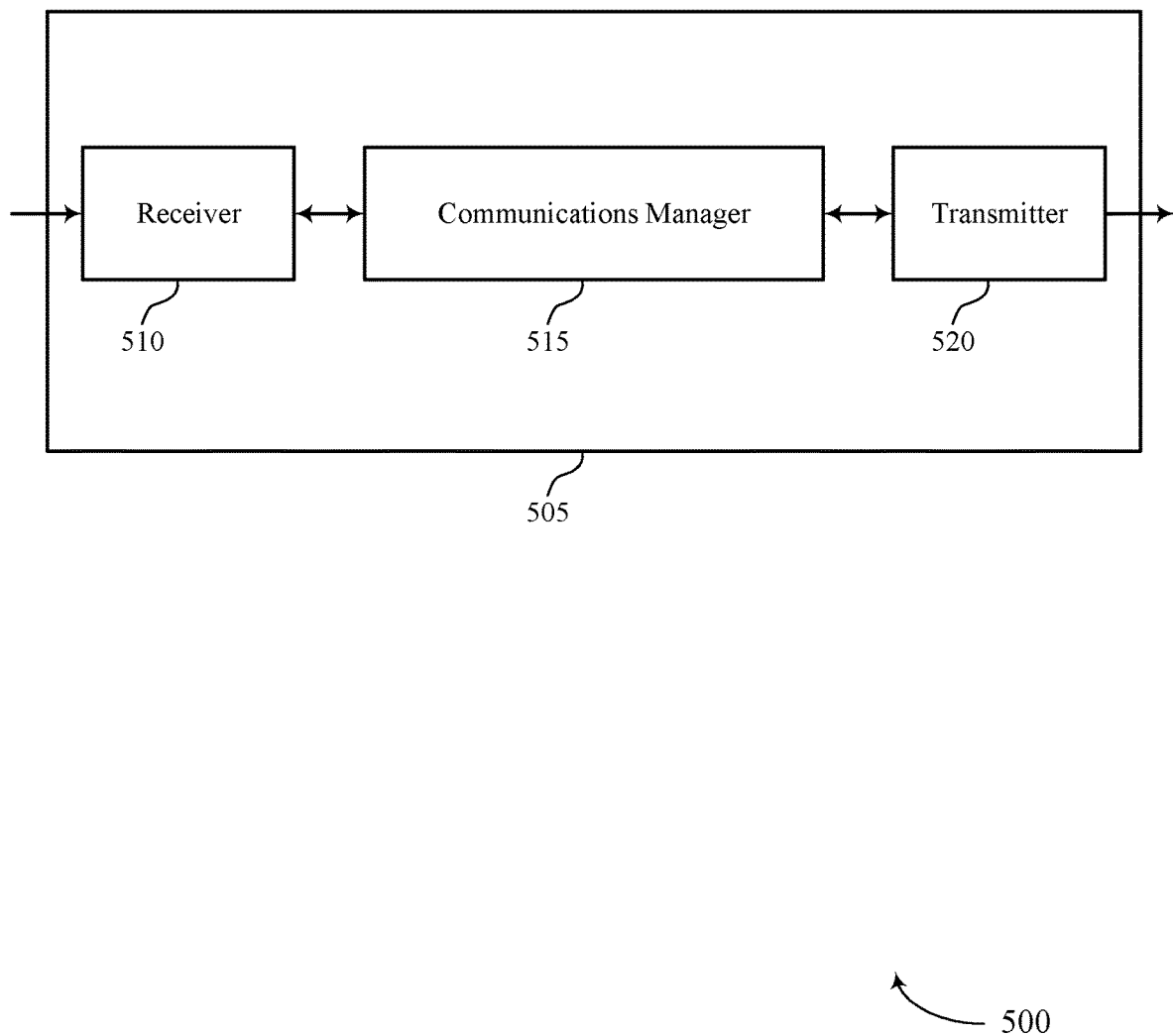
FIGS. 5 and 6 show block diagrams of devices that support channel state information reporting techniques in sidelink wireless communications in accordance with aspects of the present disclosure.

FIG. 5 shows a block diagram 500 of a device 505 that supports channel state information reporting techniques in sidelink wireless communications in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to channel state information reporting techniques in sidelink wireless communications). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, via sidelink communications from a transmitting device, one or more reference signals for determination of at least a rank indicator and a channel quality indicator at the receiving device, identify, based on one or more measurements of the one or more reference signals, a joint indication that provides at least the rank indicator and the channel quality indicator of the receiving device, and transmit, via the sidelink communications, the joint indication to the transmitting device. The actions performed by the UE communications manager 515 as described herein may be implemented to realize one or more potential advantages. One implementation may allow a UE 115 to reducing overhead by transmitting the joint indication of rank indicator and channel quality indicator. Another implementation may provide reduced granularity for one or more parameters at the UE 115, which may help to further reduce associated overhead.

The communications manager 515 may also transmit, via sidelink communications to a receiving device, one or more reference signals for determination of at least a rank indicator and a channel quality indicator at the receiving device, receive, via the sidelink communications from the receiving device, a joint indication that provides at least the rank indicator and the channel quality indicator of the receiving device, and communicate with the receiving device via the sidelink communications based on the rank indicator and the channel quality indicator. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver component. For example, the transmitter 520 may be an example of aspects of the transceiver 820 described with reference to FIG. 8. The transmitter 520 may utilize a single antenna or a set of antennas.

Figure 6:
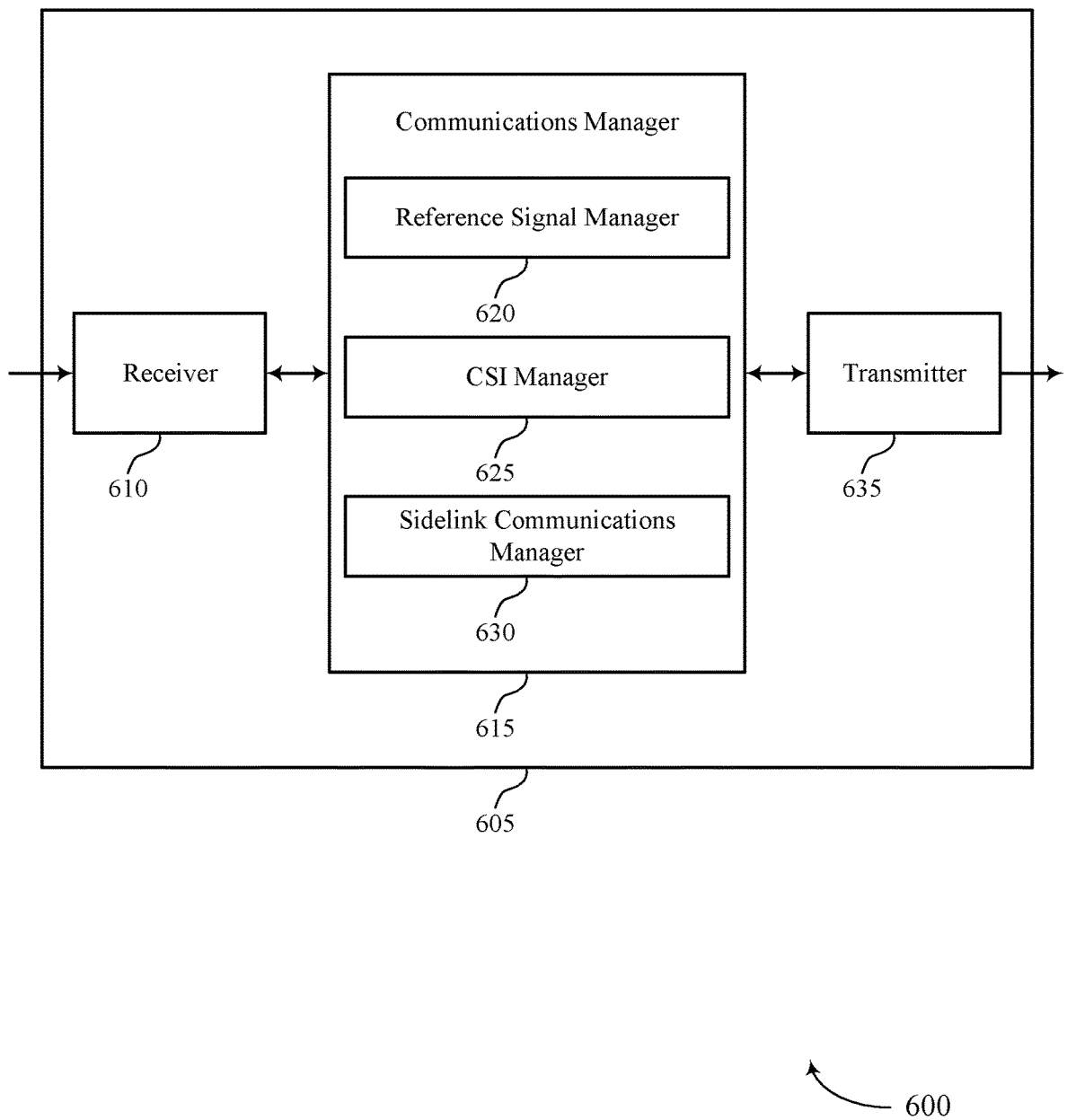

FIG. 6 shows a block diagram 600 of a device 605 that supports channel state information reporting techniques in sidelink wireless communications in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to channel state information reporting techniques in sidelink wireless communications). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a reference signal manager 620, a CSI manager 625, and a sidelink communications manager 630. The communications manager 615 may be an example of aspects of the communications manager 810 described herein.

The reference signal manager 620 may receive, via sidelink communications from a transmitting device, one or more reference signals for determination of at least a rank indicator and a channel quality indicator at the receiving device. The CSI manager 625 may identify, based on one or more measurements of the one or more reference signals, a joint indication that provides at least the rank indicator and the channel quality indicator of the receiving device. The sidelink communications manager 630 may transmit, via the sidelink communications, the joint indication to the transmitting device. Based on identifying the joint indication that provides at least the rank indicator and the channel quality indicator of the receiving device, a processor of a UE 115 (e.g., controlling the receiver 610, the transmitter 640, or the transceiver 620) may efficiently determine the rank indicator and the channel quality indicator at the receiving device. Further, the processor of UE 115 may transmit the joint indication to the transmitting device. The processor of the UE 115 may turn on one or more processing units for identifying the joint indication, increase a processing clock, or a similar mechanism within the UE 115. As such, when the joint indication is transmitted, the processor may be ready to respond more efficiently through the reduction of a ramp up in processing power.

In some cases, the reference signal manager 620 may transmit, via sidelink communications to a receiving device, one or more reference signals for determination of at least a rank indicator and a channel quality indicator at the receiving device. The CSI manager 625 may receive, via the sidelink communications from the receiving device, a joint indication that provides at least the rank indicator and the channel quality indicator of the receiving device. The sidelink communications manager 630 may communicate with the receiving device via the sidelink communications based on the rank indicator and the channel quality indicator.

The transmitter 635 may transmit signals generated by other components of the device 605. In some examples, the transmitter 635 may be collocated with a receiver 610 in a transceiver component. For example, the transmitter 635 may be an example of aspects of the transceiver 820 described with reference to FIG. 8. The transmitter 635 may utilize a single antenna or a set of antennas.

Figure 7:
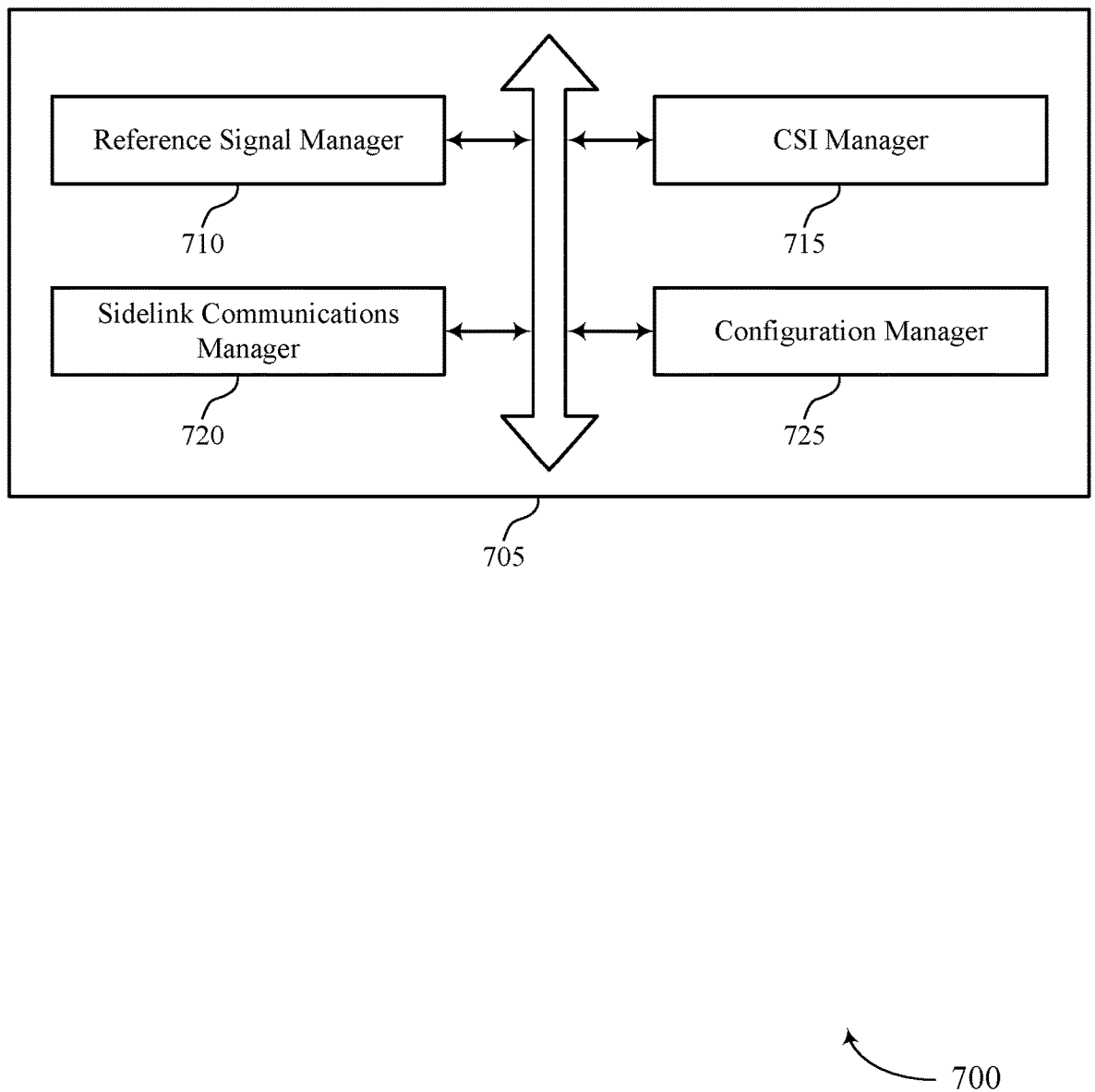
FIG. 7 shows a block diagram of a communications manager that supports channel state information reporting techniques in sidelink wireless communications in accordance with aspects of the present disclosure.

FIG. 7 shows a block diagram 700 of a communications manager 705 that supports channel state information reporting techniques in sidelink wireless communications in accordance with aspects of the present disclosure. The communications manager 705 may be an example of aspects of a communications manager 515, a communications manager 615, or a communications manager 810 described herein. The communications manager 705 may include a reference signal manager 710, a CSI manager 715, a sidelink communications manager 720, and a configuration manager 725. Each of these components may communicate, directly or indirectly, with one another (e.g., via one or more buses).

The reference signal manager 710 may receive, via sidelink communications from a transmitting device, one or more reference signals for determination of at least a rank indicator and a channel quality indicator at the receiving device.

In some examples, the reference signal manager 710 may transmit, via sidelink communications to a receiving device, one or more reference signals for determination of at least a rank indicator and a channel quality indicator at the receiving device.

The CSI manager 715 may identify, based on one or more measurements of the one or more reference signals, a joint indication that provides at least the rank indicator and the channel quality indicator of the receiving device. In some examples, the CSI manager 715 may determine the rank indicator at the receiving device based on the one or more measurements of the one or more reference signals. In some examples, the CSI manager 715 may determine the channel quality indicator at the receiving device based on the one or more measurements of the one or more reference signals. In some examples, the CSI manager 715 may identify the joint indication based on a mapping between the rank indicator and the channel quality indicator and the joint indication.

In some examples, the CSI manager 715 may identify a first entry in the first table that corresponds to the rank indicator and the channel quality indicator at the receiving device. In some examples, the CSI manager 715 may identify a first joint indication value that is associated with the first entry in the first table, and where the joint indication provides the first joint indication value to the transmitting device.

In some examples, the CSI manager 715 may determine the rank indicator of the receiving device and the channel quality indicator of the receiving device based on a mapping between the rank indicator and the channel quality indicator and the joint indication. In some examples, the CSI manager 715 may receive, via the sidelink communications from the receiving device, a joint indication that provides at least the rank indicator and the channel quality indicator of the receiving device.

In some cases, the joint indication further provides a precoding matrix indicator that is determined based on the one or more measurements of the one or more reference signals at the receiving device.

The sidelink communications manager 720 may transmit, via the sidelink communications, the joint indication to the transmitting device.

In some examples, the sidelink communications manager 720 may communicate with the receiving device via the sidelink communications based on the rank indicator and the channel quality indicator.

The configuration manager 725 may receive configuration information that indicates a first table, from a set of available tables that provide joint indication values for different combinations of rank indicators and channel quality indicators, is to be used for the sidelink communications.

In some examples, the configuration manager 725 may transmit the joint indication to a serving base station associated with one or more of the transmitting device or the receiving device.

In some examples, the configuration manager 725 may identify that a first table, from a set of available tables that provide joint indication values for different combinations of rank indicators and channel quality indicators, is to be used for the sidelink communications.

In some examples, the configuration manager 725 may transmit configuration information to the receiving device that indicates the first table is to be used for the sidelink communications.

In some examples, the configuration manager 725 may transmit the joint indication to a serving base station associated with one or more of the transmitting device or the receiving device. In some cases, the configuration information is transmitted via radio resource control signaling.

Figure 8:
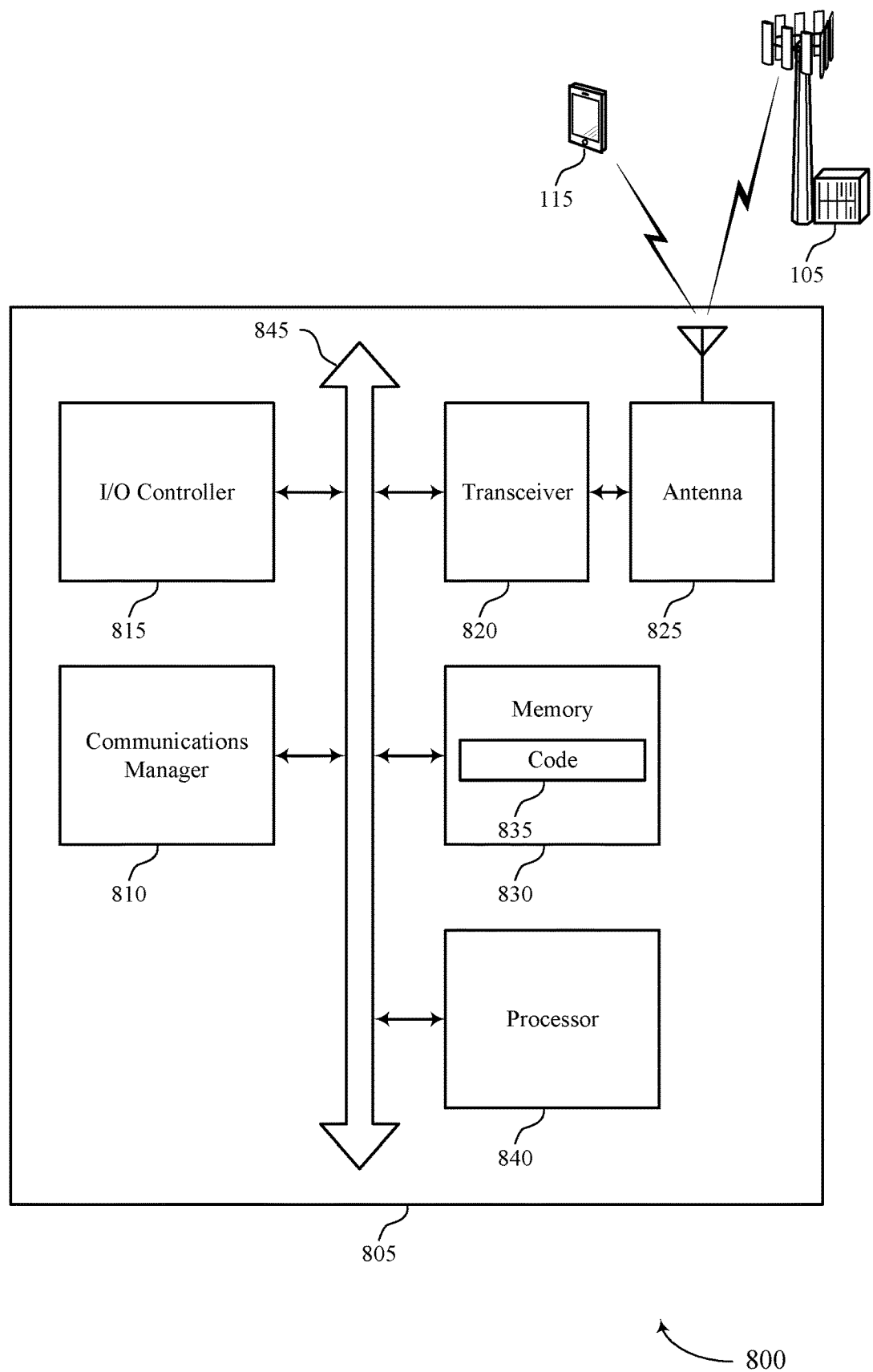
FIG. 8 shows a diagram of a system including a device that supports channel state information reporting techniques in sidelink wireless communications in accordance with aspects of the present disclosure.

FIG. 8 shows a diagram of a system 800 including a device 805 that supports channel state information reporting techniques in sidelink wireless communications in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, via sidelink communications from a transmitting device, one or more reference signals for determination of at least a rank indicator and a channel quality indicator at the receiving device, identify, based on one or more measurements of the one or more reference signals, a joint indication that provides at least the rank indicator and the channel quality indicator of the receiving device, and transmit, via the sidelink communications, the joint indication to the transmitting device.

The communications manager 810 may also transmit, via sidelink communications to a receiving device, one or more reference signals for determination of at least a rank indicator and a channel quality indicator at the receiving device, receive, via the sidelink communications from the receiving device, a joint indication that provides at least the rank indicator and the channel quality indicator of the receiving device, and communicate with the receiving device via the sidelink communications based on the rank indicator and the channel quality indicator.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases, the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/basic output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting channel state information reporting techniques in sidelink wireless communications).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
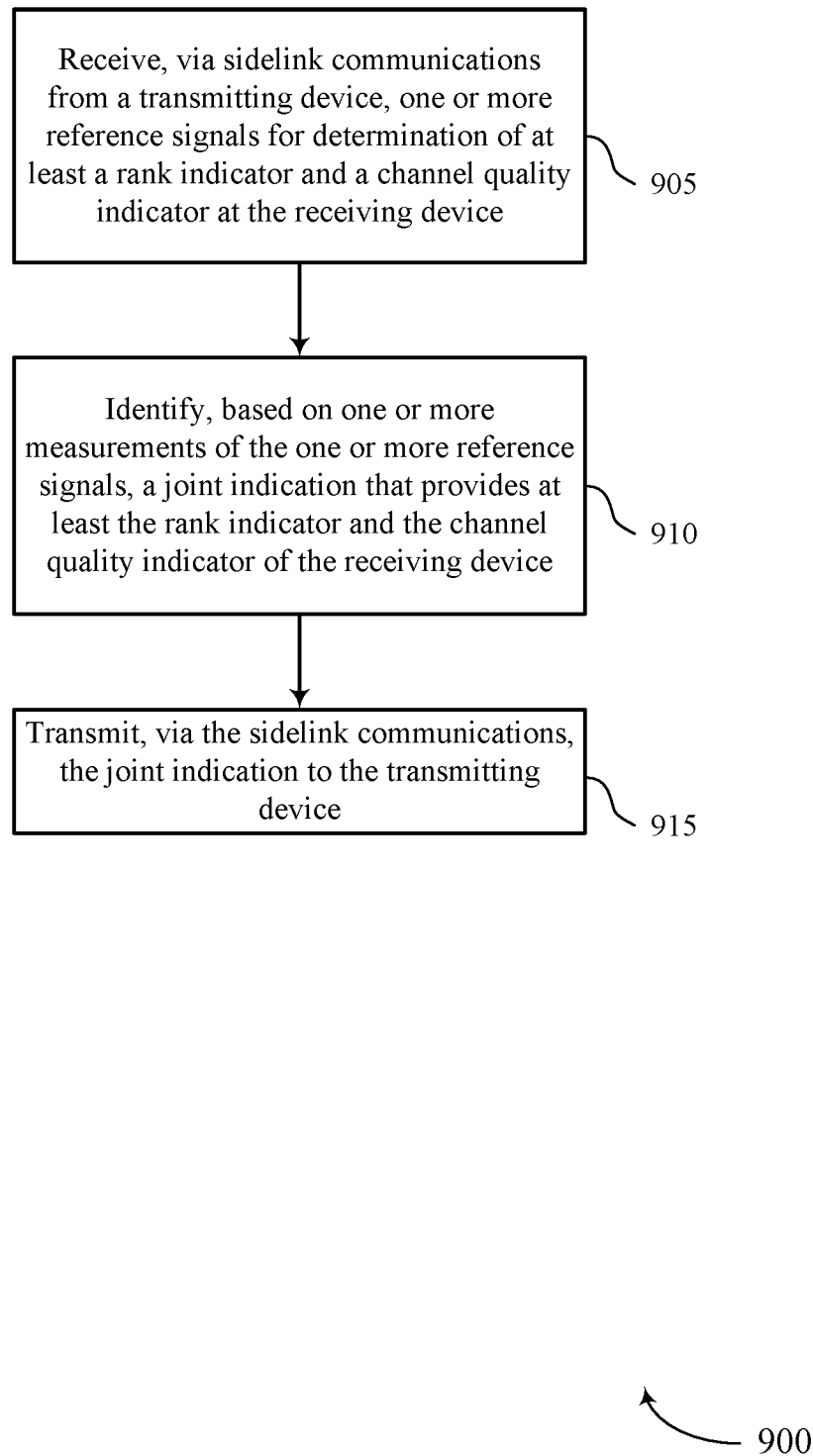
FIGS. 9 through 14 show flowcharts illustrating methods that support channel state information reporting techniques in sidelink wireless communications in accordance with aspects of the present disclosure.

FIG. 9 shows a flowchart illustrating a method 900 that supports channel state information reporting techniques in sidelink wireless communications in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may receive, via sidelink communications from a transmitting device, one or more reference signals for determination of at least a rank indicator and a channel quality indicator at the receiving device. The operations of 905 may be performed according to the methods described herein. In some examples, aspects of the operations of 905 may be performed by a reference signal manager as described with reference to FIGS. 5 through 8.

At 910, the UE may identify, based on one or more measurements of the one or more reference signals, a joint indication that provides at least the rank indicator and the channel quality indicator of the receiving device. The operations of 910 may be performed according to the methods described herein. In some examples, aspects of the operations of 910 may be performed by a CSI manager as described with reference to FIGS. 5 through 8. In some cases, the joint indication further provides a precoding matrix indicator that is determined based on the one or more measurements of the one or more reference signals at the receiving device.

At 915, the UE may transmit, via the sidelink communications, the joint indication to the transmitting device. The operations of 915 may be performed according to the methods described herein. In some examples, aspects of the operations of 915 may be performed by a sidelink communications manager as described with reference to FIGS. 5 through 8.

Figure 10:
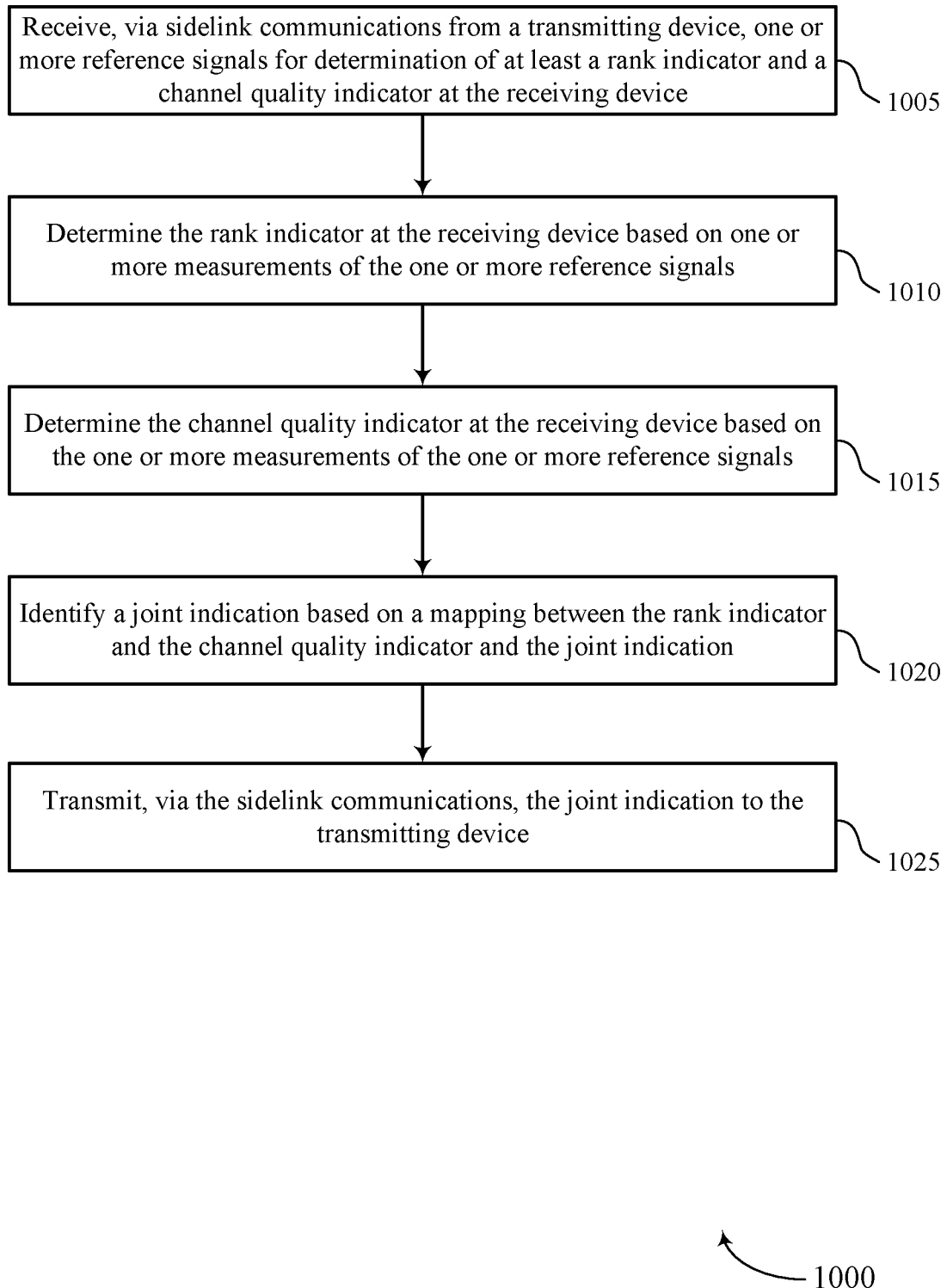

FIG. 10 shows a flowchart illustrating a method 1000 that supports channel state information reporting techniques in sidelink wireless communications in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may receive, via sidelink communications from a transmitting device, one or more reference signals for determination of at least a rank indicator and a channel quality indicator at the receiving device. The operations of 1005 may be performed according to the methods described herein. In some examples, aspects of the operations of 1005 may be performed by a reference signal manager as described with reference to FIGS. 5 through 8.

At 1010, the UE may determine the rank indicator at the receiving device based on one or more measurements of the one or more reference signals. The operations of 1010 may be performed according to the methods described herein. In some examples, aspects of the operations of 1010 may be performed by a CSI manager as described with reference to FIGS. 5 through 8.

At 1015, the UE may determine the channel quality indicator at the receiving device based on the one or more measurements of the one or more reference signals. The operations of 1015 may be performed according to the methods described herein. In some examples, aspects of the operations of 1015 may be performed by a CSI manager as described with reference to FIGS. 5 through 8.

At 1020, the UE may identify a joint indication based on a mapping between the rank indicator and the channel quality indicator and the joint indication. The operations of 1020 may be performed according to the methods described herein. In some examples, aspects of the operations of 1020 may be performed by a CSI manager as described with reference to FIGS. 5 through 8.

At 1025, the UE may transmit, via the sidelink communications, the joint indication to the transmitting device. The operations of 1025 may be performed according to the methods described herein. In some examples, aspects of the operations of 1025 may be performed by a sidelink communications manager as described with reference to FIGS. 5 through 8.

Figure 11:
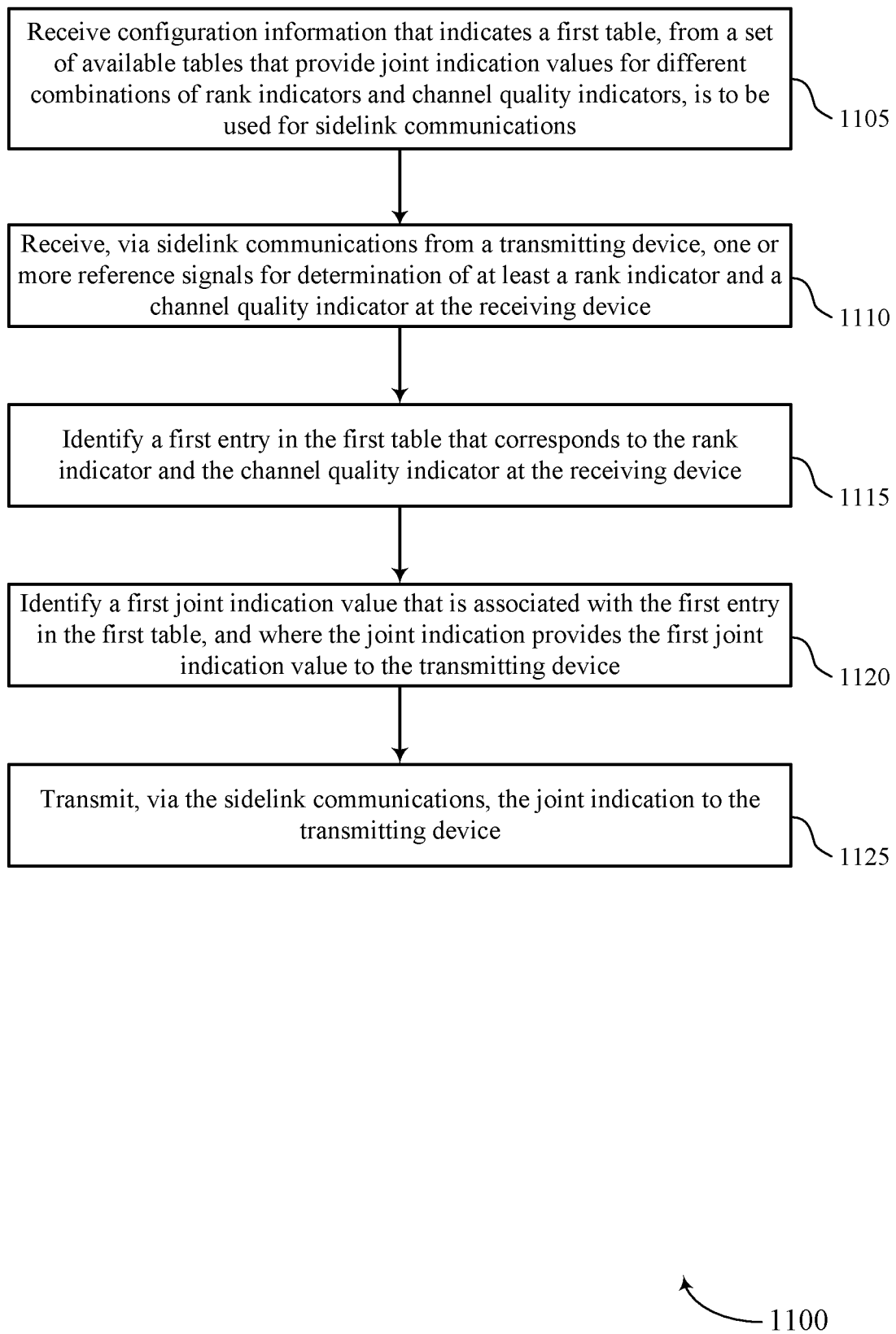

FIG. 11 shows a flowchart illustrating a method 1100 that supports channel state information reporting techniques in sidelink wireless communications in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the UE may receive configuration information that indicates a first table, from a set of available tables that provide joint indication values for different combinations of rank indicators and channel quality indicators, is to be used for sidelink communications. The operations of 1105 may be performed according to the methods described herein. In some examples, aspects of the operations of 1105 may be performed by a configuration manager as described with reference to FIGS. 5 through 8. In some cases, the configuration information is received via radio resource control signaling.

At 1110, the UE may receive, via sidelink communications from a transmitting device, one or more reference signals for determination of at least a rank indicator and a channel quality indicator at the receiving device. The operations of 1110 may be performed according to the methods described herein. In some examples, aspects of the operations of 1110 may be performed by a reference signal manager as described with reference to FIGS. 5 through 8.

At 1115, the UE may identify a first entry in the first table that corresponds to the rank indicator and the channel quality indicator at the receiving device. The operations of 1115 may be performed according to the methods described herein. In some examples, aspects of the operations of 1115 may be performed by a CSI manager as described with reference to FIGS. 5 through 8.

At 1120, the UE may identify a first joint indication value that is associated with the first entry in the first table, and where the joint indication provides the first joint indication value to the transmitting device. The operations of 1120 may be performed according to the methods described herein. In some examples, aspects of the operations of 1120 may be performed by a CSI manager as described with reference to FIGS. 5 through 8.

At 1125, the UE may transmit, via the sidelink communications, the joint indication to the transmitting device. The operations of 1125 may be performed according to the methods described herein. In some examples, aspects of the operations of 1125 may be performed by a sidelink communications manager as described with reference to FIGS. 5 through 8.

Figure 12:
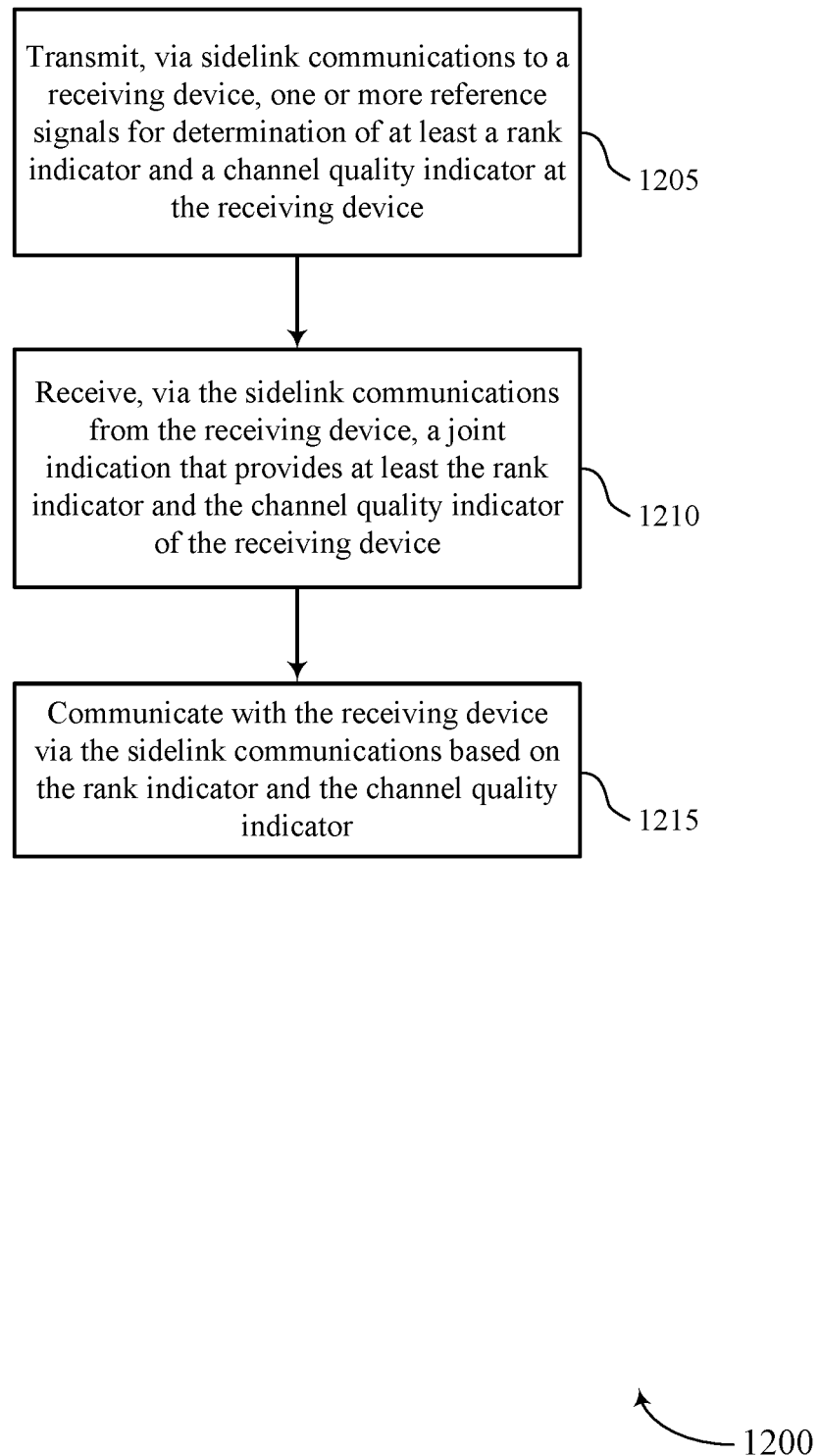

FIG. 12 shows a flowchart illustrating a method 1200 that supports channel state information reporting techniques in sidelink wireless communications in accordance with aspects of the present disclosure. The operations of method 1200 may be implemented by a UE 115 or its components as described herein. For example, the operations of method 1200 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1205, the UE may transmit, via sidelink communications to a receiving device, one or more reference signals for determination of at least a rank indicator and a channel quality indicator at the receiving device. The operations of 1205 may be performed according to the methods described herein. In some examples, aspects of the operations of 1205 may be performed by a reference signal manager as described with reference to FIGS. 5 through 8.

At 1210, the UE may receive, via the sidelink communications from the receiving device, a joint indication that provides at least the rank indicator and the channel quality indicator of the receiving device. The operations of 1210 may be performed according to the methods described herein. In some examples, aspects of the operations of 1210 may be performed by a CSI manager as described with reference to FIGS. 5 through 8. In some cases, the joint indication further provides a precoding matrix indicator that is determined based on the one or more measurements of the one or more reference signals at the receiving device.

At 1215, the UE may communicate with the receiving device via the sidelink communications based on the rank indicator and the channel quality indicator. The operations of 1215 may be performed according to the methods described herein. In some examples, aspects of the operations of 1215 may be performed by a sidelink communications manager as described with reference to FIGS. 5 through 8.

Figure 13:
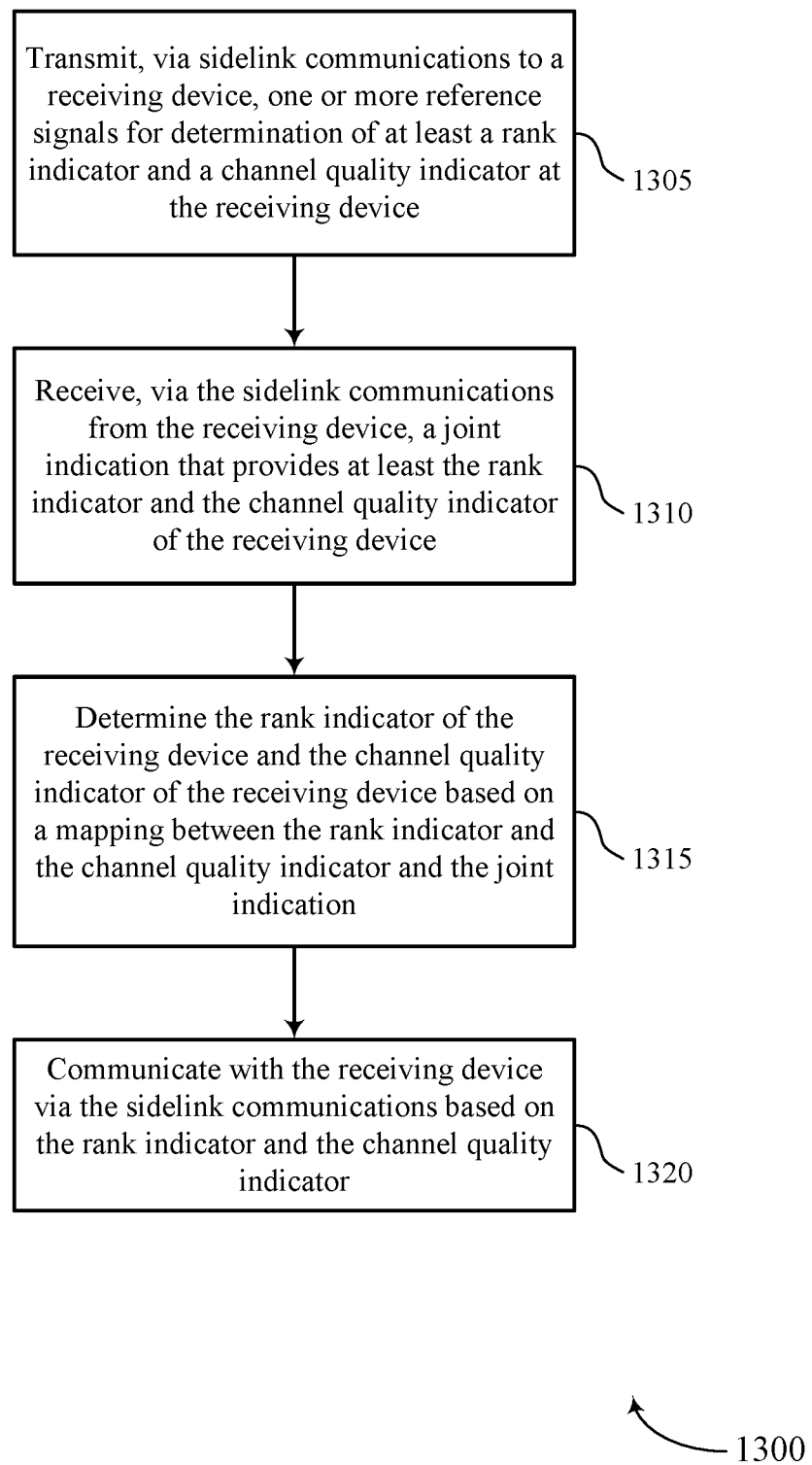

FIG. 13 shows a flowchart illustrating a method 1300 that supports channel state information reporting techniques in sidelink wireless communications in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may transmit, via sidelink communications to a receiving device, one or more reference signals for determination of at least a rank indicator and a channel quality indicator at the receiving device. The operations of 1305 may be performed according to the methods described herein. In some examples, aspects of the operations of 1305 may be performed by a reference signal manager as described with reference to FIGS. 5 through 8.

At 1310, the UE may receive, via the sidelink communications from the receiving device, a joint indication that provides at least the rank indicator and the channel quality indicator of the receiving device. The operations of 1310 may be performed according to the methods described herein. In some examples, aspects of the operations of 1310 may be performed by a CSI manager as described with reference to FIGS. 5 through 8.

At 1315, the UE may determine the rank indicator of the receiving device and the channel quality indicator of the receiving device based on a mapping between the rank indicator and the channel quality indicator and the joint indication. The operations of 1315 may be performed according to the methods described herein. In some examples, aspects of the operations of 1315 may be performed by a CSI manager as described with reference to FIGS. 5 through 8.

At 1320, the UE may communicate with the receiving device via the sidelink communications based on the rank indicator and the channel quality indicator. The operations of 1320 may be performed according to the methods described herein. In some examples, aspects of the operations of 1320 may be performed by a sidelink communications manager as described with reference to FIGS. 5 through 8.

Figure 14:
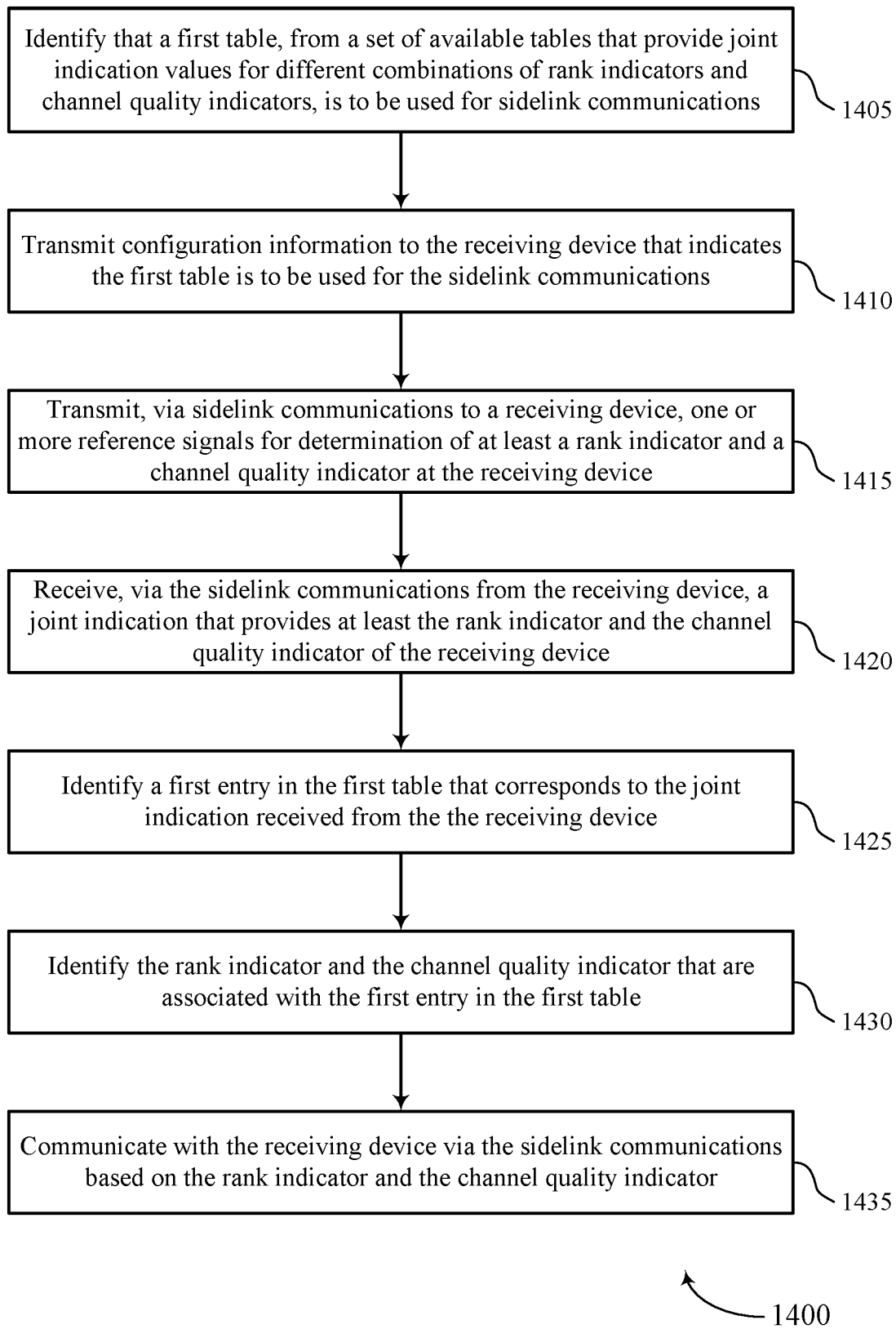

FIG. 14 shows a flowchart illustrating a method 1400 that supports channel state information reporting techniques in sidelink wireless communications in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may identify that a first table, from a set of available tables that provide joint indication values for different combinations of rank indicators and channel quality indicators, is to be used for the sidelink communications. The operations of 1405 may be performed according to the methods described herein. In some examples, aspects of the operations of 1405 may be performed by a configuration manager as described with reference to FIGS. 5 through 8.

At 1410, the UE may transmit configuration information to the receiving device that indicates the first table is to be used for the sidelink communications. The operations of 1410 may be performed according to the methods described herein. In some examples, aspects of the operations of 1410 may be performed by a configuration manager as described with reference to FIGS. 5 through 8.

At 1415, the UE may transmit, via sidelink communications to a receiving device, one or more reference signals for determination of at least a rank indicator and a channel quality indicator at the receiving device. The operations of 1415 may be performed according to the methods described herein. In some examples, aspects of the operations of 1415 may be performed by a reference signal manager as described with reference to FIGS. 5 through 8.

At 1420, the UE may receive, via the sidelink communications from the receiving device, a joint indication that provides at least the rank indicator and the channel quality indicator of the receiving device. The operations of 1420 may be performed according to the methods described herein. In some examples, aspects of the operations of 1420 may be performed by a CSI manager as described with reference to FIGS. 5 through 8.

At 1425, the UE may identify a first entry in the first table that corresponds to the joint indication received from the receiving device. The operations of 1425 may be performed according to the methods described herein. In some examples, aspects of the operations of 1425 may be performed by a CSI manager as described with reference to FIGS. 5 through 8.

At 1430, the UE may identify the rank indicator and the channel quality indicator that are associated with the first entry in the first table. The operations of 1430 may be performed according to the methods described herein. In some examples, aspects of the operations of 1430 may be performed by a CSI manager as described with reference to FIGS. 5 through 8.

At 1435, the UE may communicate with the receiving device via the sidelink communications based on the rank indicator and the channel quality indicator. The operations of 1435 may be performed according to the methods described herein. In some examples, aspects of the operations of 1435 may be performed by a sidelink communications manager as described with reference to FIGS. 5 through 8.

Embodiment 1: A method for wireless communication at a receiving device, including: receiving, via sidelink communications from a transmitting device, one or more reference signals for determination of at least a rank indicator and a channel quality indicator at the receiving device; identifying, based at least in part on one or more measurements of the one or more reference signals, a joint indication that provides at least the rank indicator and the channel quality indicator of the receiving device; and transmitting, via the sidelink communications, the joint indication to the transmitting device.

Embodiment 2: The method of embodiment 1, further including: determining the rank indicator at the receiving device based at least in part on the one or more measurements of the one or more reference signals; determining the channel quality indicator at the receiving device based at least in part on the one or more measurements of the one or more reference signals; and identifying the joint indication based at least in part on a mapping between the rank indicator and the channel quality indicator and the joint indication.

Embodiment 3: The method of any of embodiments 1 and 2: where the mapping between the rank indicator, the channel quality indicator, and the joint indication is provided in a table that provides a joint indication value for each of a plurality of different combinations of rank indicators and channel quality indicators.

Embodiment 4: The method of any of embodiments 1 to 3, further including: receiving configuration information that indicates a first table, from a plurality of available tables that provide at least one of joint indication values for different combinations of rank indicators, and channel quality indicators, or combinations thereof, to be used for the sidelink communications.

Embodiment 5: The method of any of embodiments 1 to 4, where the identifying includes: identifying a first entry in the first table that corresponds to the rank indicator and the channel quality indicator at the receiving device; and identifying a first joint indication value that is associated with the first entry in the first table, and where the joint indication provides the first joint indication value to the transmitting device.

Embodiment 6: The method of any of embodiments 1 to 5, where the configuration information is received via radio resource control signaling.

Embodiment 7: The method of any of embodiments 1 to 6, where the joint indication further provides a precoding matrix indicator that is determined based at least in part on the one or more measurements of the one or more reference signals at the receiving device.

Embodiment 8: The method of any of embodiments 1 to 8, further including: transmitting the joint indication to a serving base station associated with one or more of the transmitting device or the receiving device. Embodiment 9: An apparatus including at least one means for performing a method of any of embodiments 1 to 8.

Embodiment 10: An apparatus for wireless communications including a processor; memory in electronic communication with the processor; and instructions stored in the memory and executable by the processor to cause the apparatus to perform a method of any of embodiments 1 to 8.

Embodiment 11: A non-transitory computer-readable medium storing code for wireless communications, the code including instructions executable by a processor to perform a method of any of embodiments 1 to 8.

Embodiment 12: A method for wireless communication at a transmitting device, including: transmitting, via sidelink communications to a receiving device, one or more reference signals for determination of at least a rank indicator and a channel quality indicator at the receiving device; receiving, via the sidelink communications from the receiving device, a joint indication that provides at least the rank indicator and the channel quality indicator of the receiving device; and communicating with the receiving device via the sidelink communications based at least in part on the rank indicator and the channel quality indicator.

Embodiment 13: The method of embodiment 12, further including: determining the rank indicator of the receiving device and the channel quality indicator of the receiving device based at least in part on a mapping between the rank indicator and the channel quality indicator and the joint indication.

Embodiment 14: The method of any of embodiments 12 and 13, where the mapping between the rank indicator, the channel quality indicator and the joint indication is provided in a table that provides a joint indication value for each of a plurality of different combinations of rank indicators and channel quality indicators.

Embodiment 15: The method of any of embodiments 12 to 14, further including: identifying that a first table, from a plurality of available tables that provide joint indication values for different combinations of rank indicators and channel quality indicators, is to be used for the sidelink communications; and transmitting configuration information to the receiving device that indicates the first table is to be used for the sidelink communications.

Embodiment 16: The method of any of embodiments 12 to 15, further including: identifying a first entry in the first table that corresponds to the joint indication received from the receiving device; and identifying the rank indicator and the channel quality indicator that are associated with the first entry in the first table.

Embodiment 17: The method of any of claims 12 to 16, where the configuration information is transmitted via radio resource control signaling.

Embodiment 18: The method of any of embodiments 12 to 17, where the joint indication further provides a precoding matrix indicator that is determined based at least in part on one or more measurements of the one or more reference signals at the receiving device.

Embodiment 19: The method of any of embodiments 12 to 18 further including: transmitting the joint indication to a serving base station associated with one or more of the transmitting device or the receiving device.

Embodiment 20: An apparatus including at least one means for performing a method of any of embodiments 12 to 19.

Embodiment 21: An apparatus for wireless communications including a processor; memory in electronic communication with the processor; and instructions stored in the memory and executable by the processor to cause the apparatus to perform a method of any of embodiments 12 to 19.

Embodiment 22: A non-transitory computer-readable medium storing code for wireless communications, the code including instructions executable by a processor to perform a method of any of embodiments 12 to 19.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UNITS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a transmitting device, comprising:
   identifying that a table, from a set of available tables that provide joint indication values for different combinations of channel state information parameters, is to be used for sidelink communications;
   transmitting configuration information to a receiving device that indicates the table is to be used for the sidelink communications;
   transmitting, via the sidelink communications to the receiving device, one or more reference signals for determination of at least a first channel state information parameter and a second channel state information parameter at the receiving device;
   receiving, via the sidelink communications from the receiving device, a joint indication that provides at least the first channel state information parameter and the second channel state information parameter of the receiving device; and
   communicating with the receiving device via the sidelink communications based at least in part on the joint indication.

2. The method of claim 1, wherein identifying that the table is to be used for the sidelink communications comprises:
   selecting, by the transmitting device, the table to be used for the sidelink communications.

3. The method of claim 1, wherein identifying that the table is to be used for the sidelink communications comprises:
   receiving, from a network device, an indication of the table to be used for the sidelink communications.

4. The method of claim 1, wherein the first channel state information parameter comprises a rank indicator and the second channel state information parameter comprises a channel quality indicator.

5. The method of claim 1, further comprising:
   identifying a first entry in the table that corresponds to the joint indication received from the receiving device; and
   identifying the first channel state information parameter and the second channel state information parameter that are associated with the first entry in the table.

6. The method of claim 5, wherein:
   the joint indication provides a third channel state information parameter, the method further comprising:
      identifying the third channel state information parameter that is associated with the first entry in the table.

7. The method of claim 6, wherein the third channel state information parameter is a precoding matrix indicator.

8. The method of claim 1, wherein the receiving device, the transmitting device, or both are configured with the set of available tables.

9. The method of claim 1, wherein the joint indication comprises a joint indication value associated with a combination of the first channel state information parameter and the second channel state information parameter.

10. The method of claim 1, wherein the configuration information is transmitted via radio resource control signaling.

11. An apparatus for wireless communication at a transmitting device, comprising:
    a processor;
    memory coupled with the processor; and instructions stored in the memory and executable by the processor to cause the apparatus to:
identify that a table, from a set of available tables that provide joint indication values for different combinations of channel state information parameters, is to be used for sidelink communications;
transmit configuration information to a receiving device that indicates the table is to be used for the sidelink communications;
transmit, via the sidelink communications to the receiving device, one or more reference signals for determination of at least a first channel state information parameter and a second channel state information parameter at the receiving device;
receive, via the sidelink communications from the receiving device, a joint indication that provides at least the first channel state information parameter and the second channel state information parameter of the receiving device; and
communicate with the receiving device via the sidelink communications based at least in part on the joint indication.

12. The apparatus of claim 11, wherein the instructions to identify that the table is to be used for the sidelink communications are executable by the processor to cause the apparatus to:
select, by the transmitting device, the table to be used for the sidelink communications.

13. The apparatus of claim 11, wherein the instructions to identify that the table is to be used for the sidelink communications are executable by the processor to cause the apparatus to:
receive, from a network device, an indication of the table to be used for the sidelink communications.

14. The apparatus of claim 11, wherein the first channel state information parameter comprises a rank indicator and the second channel state information parameter comprises a channel quality indicator.

15. The apparatus of claim 11, wherein the instructions are further executable by the processor to cause the apparatus to:
identify a first entry in the table that corresponds to the joint indication received from the receiving device; and
identify the first channel state information parameter and the second channel state information parameter that are associated with the first entry in the table.

16. The apparatus of claim 15, wherein:
the joint indication provides a third channel state information parameter, the instructions further executable by the processor to cause the apparatus to:
identify the third channel state information parameter that is associated with the first entry in the table.

17. The apparatus of claim 16, wherein the third channel state information parameter is a precoding matrix indicator.

18. The apparatus of claim 11, wherein the receiving device, the transmitting device, or both are configured with the set of available tables.

19. The apparatus of claim 11, wherein the joint indication comprises a joint indication value associated with a combination of the first channel state information parameter and the second channel state information parameter.

20. An apparatus for wireless communication at a transmitting device, comprising:
means for identifying that a table, from a set of available tables that provide joint indication values for different combinations of channel state information parameters, is to be used for sidelink communications;
means for transmitting configuration information to a receiving device that indicates the table is to be used for the sidelink communications;
means for transmitting, via the sidelink communications to the receiving device, one or more reference signals for determination of at least a first channel state information parameter and a second channel state information parameter at the receiving device;
means for receiving, via the sidelink communications from the receiving device, a joint indication that provides at least the first channel state information parameter and the second channel state information parameter of the receiving device; and
means for communicating with the receiving device via the sidelink communications based at least in part on the joint indication.

\* \* \* \* \*